United States Patent [19]

Hunt

[11] Patent Number: 5,408,579
[45] Date of Patent: Apr. 18, 1995

[54] ELECTRIC ELEMENT ASSEMBLY

[75] Inventor: Andrew Hunt, Bowden, Great Britain

[73] Assignee: Sheathed Heating Elements Limited, Manchester, Great Britain

[21] Appl. No.: 975,560
[22] PCT Filed: Jun. 24, 1992
[86] PCT No.: PCT/GB92/01147
 § 371 Date: Jun. 24, 1993
 § 102(e) Date: Jun. 24, 1993
[87] PCT Pub. No.: WO93/00780
 PCT Pub. Date: Jan. 7, 1993

[30] Foreign Application Priority Data

Jun. 24, 1991 [GB] United Kingdom ............... 9113581

[51] Int. Cl.6 .................................. H05B 3/82
[52] U.S. Cl. .............................. 392/498; 219/441; 392/497
[58] Field of Search ............... 392/498, 497; 219/523, 219/541

[56] References Cited

U.S. PATENT DOCUMENTS

| | | | |
|---|---|---|---|
| 2,888,547 | 5/1959 | Saper | 392/498 |
| 3,614,387 | 10/1971 | Wrob | 392/498 |
| 4,044,224 | 8/1977 | Jenkins | 392/498 |
| 4,697,069 | 9/1987 | Bleckmann | 219/517 |
| 4,730,099 | 3/1988 | Bleckman | 219/328 |
| 5,020,128 | 5/1991 | Bleckmann | 392/498 |

FOREIGN PATENT DOCUMENTS

| | | |
|---|---|---|
| 89/43507 | 5/1990 | Australia . |
| 61-202048 | 9/1986 | Japan ............... 392/498 |
| 3-12478 | 5/1991 | Japan ............... 219/541 |
| 957518 | 5/1964 | United Kingdom . |
| 1019794 | 2/1966 | United Kingdom . |
| 1125262 | 8/1968 | United Kingdom . |
| 1234030 | 6/1971 | United Kingdom . |
| 1278121 | 6/1972 | United Kingdom . |
| 1289777 | 9/1972 | United Kingdom . |
| 1470364 | 4/1977 | United Kingdom . |
| 2022380 | 12/1979 | United Kingdom . |
| 2044590 | 10/1980 | United Kingdom . |
| 90/09672 | 8/1990 | WIPO . |

Primary Examiner—Teresa J. Walberg
Attorney, Agent, or Firm—Longacre & White

[57] ABSTRACT

An electric heating assembly for use with an electric kettle or similar liquid heating apparatus has a resistance heating wire disposed within a metal sheath and connected to pins which project from respective ends of the sheath. A temperature sensitive cut-out device is connected in thermal transfer relationship to a sleeve or liner of thermally conductive material which is fitted into the element sheath at one end thereof in thermal transfer relationship with the inner surface of the sheath. The sleeve or liner extends into the sheath a sufficient distance to surround a heated portion of the resistance heating wire adjacent its connection to the inner end of the respective pin.

16 Claims, 2 Drawing Sheets

ELECTRIC ELEMENT ASSEMBLY

This invention concerns an electric element assembly for liquid heating purposes, particularly but not exclusively for an electric kettle.

Conventionally, an electric kettle element assembly, of the type with which the present invention is concerned, comprises a substantially flat metal backplate and a metal-sheathed resistance heating element which extends from and has its ends sealingly connected to the backplate, with a central portion of the sheath also in direct thermal transfer relation with the backplate. In use, the backplate is sealed relative to an aperture in the kettle wall, with the element extending into the liquid reception vessel.

The reason for having the central portion of the sheath in direct thermal transfer relation with the backplate is to effect rapid heat transfer through the backplate to a temperature sensitive cut-out (usually a bimetallic strip, but possibly a plastics strip) disposed at the other side in the event that the element is operated when not immersed in liquid, so as to cut off power supply to the element before too much damage is done.

The backplate and the element sheath are conventionally formed of copper or an alloy of copper, which are good heat conductors. However, stainless steel is increasingly popular since, despite having poorer conductivity, it has the advantage that it does not discolour over a period of use in boiling water.

Conventionally, the ends (legs) and central portion of the element sheath have been connected to the backplate by brazing. This involves applying a jointing or "brazing" material, such as a copper alloy, (in the manner of a glue) between the regions to be connected and then placing the entire subassembly in a furnace to heat all the material sufficiently to melt the brazing material, and form an effective joint. This would usually be done in two stages, firstly to connect the central element sheath portion, then to connect the legs. Brazing is imprecise, messy and costly and is best avoided as part of a manufacturing process. Moreover, in the case of stainless steel, higher temperatures are required to produce effective joints by brazing so a higher cost is involved in having to install, or adapt, and run a furnace for higher temperature operation in addition to the general difficulty of automating any brazing procedure.

In their earlier applications Nos. 91 02915 and 91 02883 the applicants set forth proposals for avoiding any brazing process in production of the relevant type of electric element assemblies by making special provision for welding a central region of the element sheath to the backplate and by connecting the ends of the element sheath to the backplate in various different ways.

The object of the present invention is to propose novel electric heating assemblies which avoid the need to connect a central portion of the element sheath to the backplate, by brazing or otherwise, by providing alternative means for actuation of a temperature sensitive cut-out.

According to a first aspect of the invention an electric element assembly for liquid heating purposes comprising an element, in the form of a resistance heating wire disposed within a metal sheath and connected to pins which project from respective ends of the sheath, is characterised by having temperature sensitive cut-out means mounted in thermal transfer relationship with the element sheath at one end thereof.

In practical embodiments in accordance with this first aspect of the invention the temperature sensitive cut-out means is conveniently connected to a sleeve or liner of thermally conductive material which is fitted into the element sheath in thermal transfer relationship with the inner surface of the sheath. Provision of such a sleeve or liner intermediate the sheath and the cut out means is especially desirable when the sheath itself is of steel and of relatively poor thermal conductivity.

Such a sleeve or liner may be a simple friction fit in the sheath or it may be spot welded to the sheath.

According to a second aspect of the invention an electric element assembly for liquid heating purposes comprising an element, in the form of a resistance heating wire disposed within a metal sheath and connected to pins which project from respective ends of the sheath, is characterised by having temperature sensitive cut-out means mounted in thermal transfer relationship with a sleeve of thermally conductive material which is inserted into one end of the sheath.

In practical embodiments in accordance with this second aspect of the invention the sleeve need not be mounted in contact with or in thermal transfer relationship with the inner surface of the sheath. The cut-out arrangement could work satisfactory with a layer of insulating material between the sleeve and the sheath, in which case the sleeve may be mounted simply by being embedded in insulating material within the sheath.

Thus, when an element in accordance with either aspect of the invention is mounted onto a backplate by the sheath extending through and being sealingly connected to the backplate adjacent its ends, there is no longer any need for intimate contact between a central portion of the element sheath and the backplate. Brazing can be completely eliminated from the manufacturing procedure by not effecting any connection of the central portion to the backplate and by using other connection means, such as sealing rings held by frictionally engaged discs for connection of the legs of the sheath through apertures in the backplate. In this respect, various connection means for the legs which avoid brazing are described in more detail in the applicant's earlier UK application No. 91 02915.

Copper is a suitable material for the sleeve or liner within either aspect of the invention.

The terms sleeve or liner as used within this specification are intended to refer to members which, whilst not necessarily completely surrounding or encircling respective conductive pins, at a spacing therefrom, extend at least part way around said pins, usually around a major part. Thus the terms sleeve or liner include slotted or perforated members as well as simple cylindrical members. These need not be mounted concentrically of the element sheath or the respective pin, although they will most usually be so mounted.

Furthermore, the sleeve or liner may conveniently be formed of two or more separate pieces or fixed adjacently. A gap between such adjacent pieces can form the slot or perforation when required.

In embodiments within the first or second aspects of the invention, to facilitate connection to the cut-out means a portion of the sleeve or liner preferably projects beyond the end of the sheath.

The pins, which project from the sheath and to which the resistance heating wire is connected, are traditionally of poor thermal conductivity, being merely required to be good conductors of current between the heating wire and electric power supply connections at the opposite side of the backplate. In this respect, the usual material for those pins is steel.

Thus, in order to maximise heat transfer from the resistance heating wire to the cut out means, in embodiments within the first or second aspects of the invention the sleeve or liner may advantageously extend into the sheath a sufficient distance to surround a portion of the resistance heating wire, adjacent its connection to the inner end of the respective pin. Heat will then be conducted from the wire to the sleeve or liner by way of any intermediate electric insulating material, such as magnesium oxide, in which the wire is embedded.

Of course, in embodiments where the sleeve or liner is connected to or in contact with the sheath, and particularly where the sheath is a good heat conductor (i.e. of copper), heat will also be transmitted to the sleeve or liner by conduction from the sheath. In such embodiments, but also in others, the cut-out arrangement may still operate satisfactorily when the sleeve or liner simply surrounds a part of the pin and stops short of the wire or the region where the pin connects to the wire.

The temperature sensitive cut-out means within either aspect of the invention is conveniently a conventional bi-metallic strip, which bends upon heating and thereby breaks the circuit whereby power is supplied to the element by way of the pins. The alternative of a plastics cut-out means is also possible, but unlike a bimetallic strip, it does not provide for reversible operation (it disintegrates upon overheating) so it is only useful as an ultimate fail safe to prevent complete burn out of an appliance.

The invention also provides an electric element for liquid purposes comprising an element in the form of a resistance heating wire disposed within a metal sheath and connected to pins which project from respective ends of the sheath, characterised in that a sleeve or liner of thermally conductive material is fitted into the lement in thermal transfer relationship with the inner surface of the sheath.

In a further aspect, the invention provides an electric element for liquid heating purposes comprising an element in the form of a resistance heating wire disposed within a metal sheath and connected to pins which project from respective ends of the sheath, characterised in that the element includes a sleeve or liner of thermally conductive material which is inserted into one end of the sheath, which sleeve or liner is adapted to engage temperature sensitive cut-out means in a thermal transfer relationship.

The invention will be explained further by way of further example, with reference to the accompanying drawings, in which.

Figure 1:
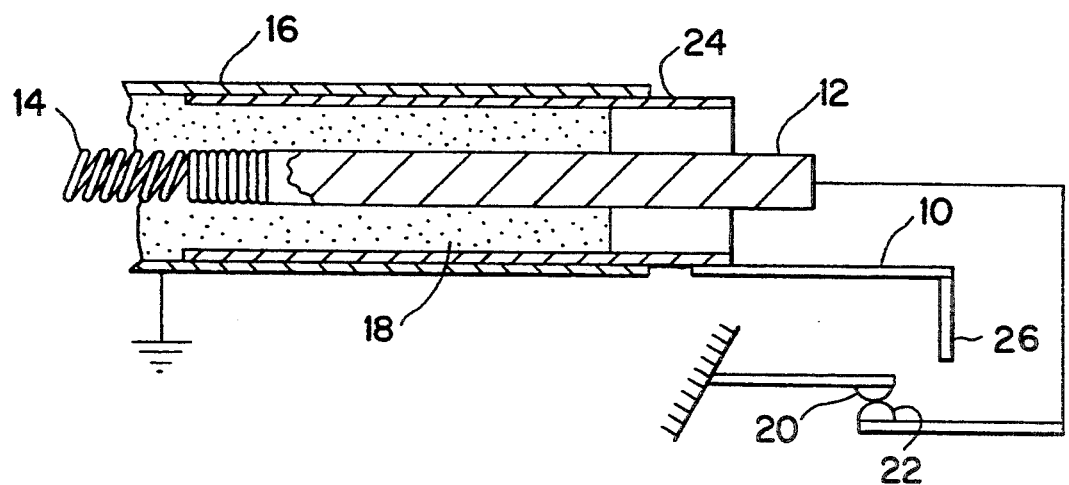
FIG. 1 is a schematic illustration of connection or a bimetal to a sheath of a heating element by way of a sheath liner in accordance with the first and second aspects of the present invention.

FIG. 1 shows one end of an electric element as used in a kettle. A pin 12 is connected to one end of a coiled resistance heating wire 14 of any conventional material, such as an alloy including any of nickel, chromium, iron and aluminium. The coiled wire 14 extends through a tubular sheath 16 of stainless steel or copper but is electrically insulated therefrom by a packing 18 of magnesium oxide or other suitable material. The pin 12 projects from the end of the sheath 16 and is similarly electrically insulated therefrom. A seal or plug (not shown) may also be provided outwardly of the insulating material.

At its other end the wire 14 is connected to another pin (not shown) which projects from the other end of the sheath 16 in similar manner.

In use, a voltage is applied to the wire 14 via the pins. Owing to its resistance, the wire 14 heats up. The surrounding sheath 16 also heats up and transfers heat to its surrounding medium. In this case, the element is designed as a kettle element for immersion in water to boil the water.

A bimetal strip 10 is connected to the element sheath 16 by way of an additional sleeve 24 which is mounted inside the end margin of the sheath 16, for example as friction fit therein or by spot welding. The sleeve 24 is inserted into the sheath 16 a sufficient distance to surround an end portion of the wire 14, where the latter connects to the inner end of the pin 12, and also projects from the sheath 16 concentrically of the pin 12. The sleeve 24 should have good heat conductivity. It may be of copper or any suitable alloy.

The sheath 16 is not a current carrier (diagrammatically represented by earth symbol) so there is no conduction of electricity to or through the bimetal 10, which, consequently, is not part of the power supply circuit. The bimetal 10 may suitably carry a finger 26 of insulating material whereby contacts 20, 22 in the power supply circuit to the pins 12 will be broken upon deflection of the bimetal 10.

Heat is conducted from the sheath 16 to the bimetal 10, by way of the sleeve 24, much faster when there is no water surrounding the sheath 16 to take up the heat generated by the wire 14. Thus, under dry operation, the bimetal 10 rapidly reaches a temperature of about 125° where it deflects and breaks the power supply circuit. While the element is immersed in water, the temperature rise of the bimetal is slower and it will not reach a temperature sufficient to cause breaking of the circuit.

In other respects the manner of operating is readily apparent to those skilled in the art.

It is to be emphasised that the foregoing is only one example of an arrangement within the scope of the invention.

In accordance with the first aspect of the invention the use of an intermediate sleeve may be dispensed with. Thus, whilst use of an intermediate sleeve of high thermal conductivity is highly advantageous in cases where the sheath itself is of steel, and therefore not a particularly good heat conductor, in cases where the sheath is of copper the bimetal may suitably be connected directly to one end of the sheath, or connected thereto in some other manner.

Figure 2:
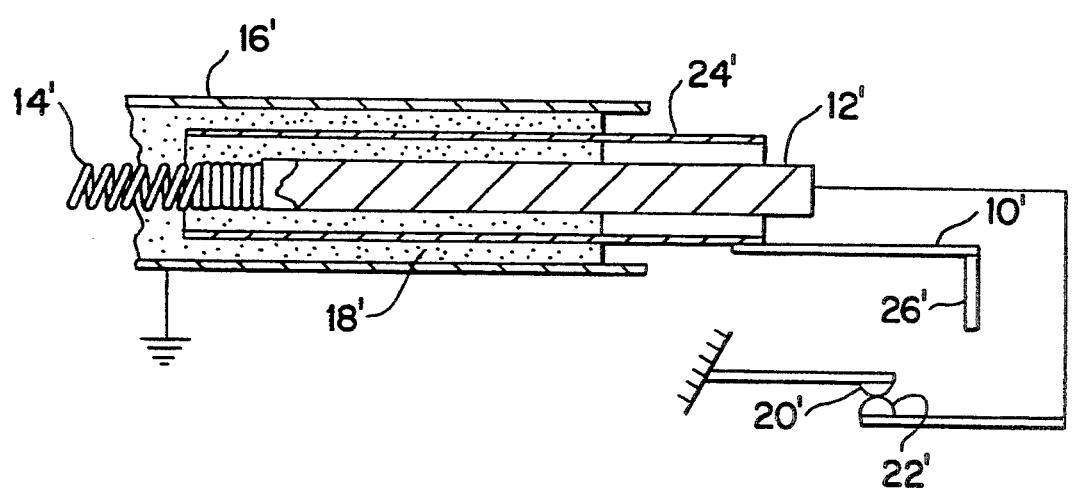
FIG. 2 is a comparable illustration of connection of a bimetal to a separate sleeve inserted into the sheath in accordance with the second aspect of the present invention.

FIG. 2 shows an alternative arrangement, in accordance with the second aspect of the invention. The same reference numerals as in FIG. 1, but with suffix ', have been used to designate parts which are equivalent to those in FIG. 1 so that repetition of their basic description need not be repeated.

In this embodiment the bimetal strip 10' is again connected to the thermally conductive sleeve 24', but the latter is neither connected to nor in contact with the element sheath 16'. Thus, the bimetal 10' is not necessarily in thermal transfer relationship with the sheath 16' and, particularly where the latter is of a poor thermally conductive material, such as steel, the majority of the heat transferred to the bimetal 10' by the sleeve 24' is derived by conduction through the insulating material 18' from the wire 14', and the pin 12'. In other respects, operation is precisely the same as in FIG. 1.

It should be pointed out that FIG. 2 is only one example of an arrangement within the scope of the second aspect of the invention. In other embodiments, the sleeve may be in contact with the sheath, exactly as in FIG. 1.

Whichever type of arrangement is employed—direct connection of a bimetal to the element sheath, or connection of a bimetal to the sheath by way of a thermally conductive sleeve, as in FIG. 1, or connection of a bimetal to a sleeve which is quite separate from the sheath, as in FIG. 2—respective bimetal cut-out arrangements may be provided at each end of the element, as a fail safe measure. Also, in all cases, cut-out means other than a bimetal strip may also be employed, the principle remaining the same, except that with plastics cut-out fuses, the cut-out is not reversible as the fuse disintegrates and has to be replaced before the element will operate again.

Figure 3:
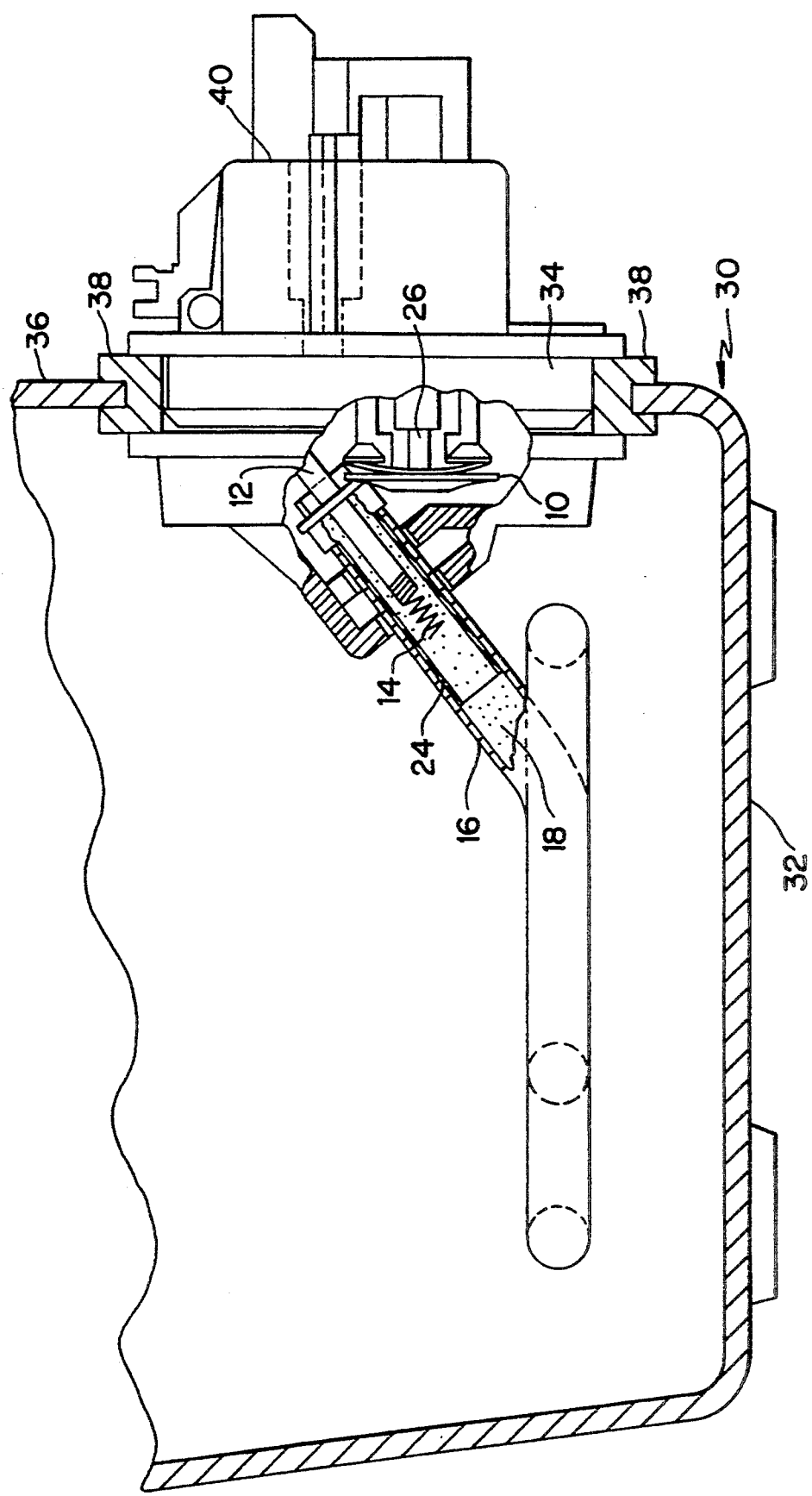
FIG. 3 is a part sectional view of an electric element assembly fitted to an electric kettle.

FIG. 3 shows a first aspect of the invention generally according to FIG. 1, as fitted to an electric kettle 30. It will be seen that the element sheath 16 is arranged in a substantialy planar configuration in a kettles bottom 32. The arrangement may be as a coil or as to adjacent loops or any other convenient configuration. Both ends of the sheath 16 are secured in a housing 34 which passes through the kettles sidewall 36 and is sealed thereto by a peripheral sealing ring or grommet 38.

The housing 34 serves to retain the bimetallic strip 10, the connected finger 26 and the various electrical components including the contacts 20, 22 etc and is sealed to prevent any water entering therein. THe housings exterior 40 provides an electrical connection point for the application of a voltage to the wire 14 enclosed in the sheath. It is also possible to provide two sleeves 24 one at each end of the wire 14 where it connects with the electricity supply.

I claim:

1. An electric element assembly for liquid heating purposes comprising an element, in the form of a resistance heating wire disposed within a metal sheath and connected to pins which project from respective ends of the sheath, the assembly further comprising temperature sensitive cut-out means, connected in thermal transfer relationship to a sleeve or liner of thermally conductive material which is fitted into the element sheath at one end thereof in thermal transfer relationship with the inner surface of the sheath, in which the sleeve or liner extends into the sheath a sufficient distance to surround a heated portion of the resistance heating wire, adjacent its connection to the inner end of the respective pin.

2. An electric element assembly as claimed in claim 1 in which the sleeve or liner is a friction fit in the end of the sheath.

3. An electric element assembly as claimed in claim 1 in which the sleeve or liner is spot welded to the sheath.

4. An electric element assembly as claimed in claim 1 in which the sleeve or liner is not mounted in contact with the inner surface of the sheath, but is in thermal transfer relationship therewith.

5. An electric element assembly as claimed in claim 4 in which a layer of insulating material is provided between the sleeve or liner and the sheath.

6. An electric element assembly as claimed in claim 5 in which the sleeve or liner is embedded in insulating material within the sheath.

7. An electric element assembly as claimed in claim 1 in which the sleeve or liner is of copper.

8. An electric element assembly as claimed in claim 1 in which the sleeve or liner is a slotted or perforated member.

9. An electric element assembly as claimed in claim 8 in which the slot or perforation is provided by a gap between adjacent pieces of the sleeve or liner.

10. An electric element assembly as claimed in claim 1 in which the sleeve or liner is composed of two or more separate pieces.

11. An electric element assembly as claimed in claim 1 in which the sleeve or liner is mounted concentrically of the element sheath or of the respective pin.

12. An electric element assembly as claimed in claim 1 in which a portion of the sleeve or liner projects beyond the end of the sheath to facilitate connection to the cut-out means.

13. An electric element assembly as claimed in claim 1 in which the temperature sensitive cut-out means is a bimetallic strip, which bends upon heating and thereby breaks an electric circuit whereby power is supplied to the element by way of the pins.

14. An electric element assembly as claimed in claim 1 in which the temperature sensitive cut-out means is a melting or deforming part which operates to open contacts and break an electric circuit supplying power to the element.

15. An electric element assembly as claimed in claim 1 in which two temperature sensitive cut-out means are provided, one being a cut-out means comprising a bimetallic strip which bends upon heating and thereby breaks an electric circuit whereby power is supplied to the element by way of the pins, and a second cut-out means comprising a melting or deforming part which operates to open contacts and break an electric circuit supplying power to the element.

16. An electric element assembly as recited in claim 1, wherein:
said electric element is fitted to a liquid heating apparatus.

* * * * *